US012060677B2

(12) United States Patent
De Palmenaer et al.

(10) Patent No.: US 12,060,677 B2
(45) Date of Patent: Aug. 13, 2024

(54) SYSTEMS AND METHODS FOR THE FUNCTIONALIZATION OF POLYOLEFIN FIBERS

(71) Applicant: Saudi Arabian Oil Company, Dhahran (SA)

(72) Inventors: Andreas De Palmenaer, Eupen (BE); Mohamed Bouhrara, El Jadida (MA); Hassan Almousa, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 529 days.

(21) Appl. No.: 17/220,116

(22) Filed: Apr. 1, 2021

(65) Prior Publication Data

US 2022/0316132 A1 Oct. 6, 2022

(51) Int. Cl.
*D06M 15/227* (2006.01)
*B05B 7/06* (2006.01)
(Continued)

(52) U.S. Cl.
CPC ........... *D06M 15/227* (2013.01); *B05B 7/061* (2013.01); *B05B 16/20* (2018.02); *B05C 3/125* (2013.01);
(Continued)

(58) Field of Classification Search
USPC ................. 118/313, 315, 325, 326; 422/292; 427/421.1, 427.1
See application file for complete search history.

(56) References Cited

U.S. PATENT DOCUMENTS 37,160 A 12/1862 Engle
44,710 A 10/1864 Davey
(Continued)

FOREIGN PATENT DOCUMENTS

CN 201288230 Y * 8/2009
EP 1938907 A1 7/2008
(Continued)

OTHER PUBLICATIONS

Notification of Transmittal of the International Search Report and the Written Opinion of the International Searching Authority, or the Declaration dated Jun. 15, 2022 pertaining to International application No. PCT/US2022/021155 filed Mar. 21, 2022, 16 pages.
(Continued)

*Primary Examiner* — Yewebdar T Tadesse
(74) *Attorney, Agent, or Firm* — DINSMORE & SHOHL LLP

(57) ABSTRACT

A system for the functionalization of polyolefin fiber includes a reactor chamber, a fiber pulley system, and a precursor sprinkler system. The reactor chamber defines an interior reactor space and a plurality of fiber inlet/outlet pairs positioned at opposite ends of respective fiber processing axes. The fiber pulley system is arranged to direct polyolefin fiber through the plurality of fiber inlet/outlet pairs, along a fiber processing path comprising the respective fiber processing axes. The precursor sprinkler system is operable to aerosolize a precursor solution and contact the aerosolized precursor solution with the polyolefin fiber. A method for functionalizing polyolefin fiber includes aerosolizing the precursor solution to form an aerosolized precursor solution, passing polyolefin fiber along the fiber pulley system into the reactor chamber, contacting the polyolefin fiber with the aerosolized precursor solution, and passing functionalized
(Continued)

polyolefin fiber out of the interior reactor space of the reactor chamber.

19 Claims, 6 Drawing Sheets

(51) Int. Cl.

| | |
|---|---|
| ***B05B 16/20*** | (2018.01) |
| ***B05C 3/12*** | (2006.01) |
| ***B05C 5/02*** | (2006.01) |
| ***D06M 11/55*** | (2006.01) |
| ***D06M 15/70*** | (2006.01) |
| ***D06M 23/06*** | (2006.01) |
| *D06M 101/20* | (2006.01) |

(52) U.S. Cl.

CPC ........... *B05C 5/0245* (2013.01); *D06M 11/55* (2013.01); *D06M 15/70* (2013.01); *D06M 23/06* (2013.01); *D06M 2101/20* (2013.01)

(56) References Cited

U.S. PATENT DOCUMENTS

| | | | | |
|---|---|---|---|---|
| 152,574 | A | 6/1874 | Snellbaker | |
| 2,212,786 | A | 8/1940 | McQueen | |
| 2,507,088 | A | 5/1950 | Walton | |
| 2,889,259 | A | 6/1959 | Noeske | |
| 3,413,337 | A | 11/1968 | Bost | |
| 3,542,746 | A | 11/1970 | Eckardt | |
| 4,070,446 | A | 1/1978 | Horikiri et al. | |
| 10,023,513 | B1 * | 7/2018 | Keen | C07C 29/44 |
| 2005/0178330 | A1 | 8/2005 | Goodwin et al. | |
| 2006/0196424 | A1 * | 9/2006 | Swallow | H05H 1/46 118/723 E |
| 2007/0202315 | A1 | 8/2007 | Duffield et al. | |
| 2014/0377476 | A1 | 12/2014 | Mistry | |
| 2015/0298445 | A1 * | 10/2015 | Covini | D04H 1/542 156/199 |

FOREIGN PATENT DOCUMENTS

| | | | |
|---|---|---|---|
| WO | 199203601 | A2 | 3/1992 |
| WO | 2009129364 | A2 | 10/2009 |

OTHER PUBLICATIONS

Foster, "Sulfonation and Sulfation Processes", The Chemithon Corporation, pp. 1-36, 1997.

Park et al., "Roll-to-Roll Coating Technology and its Applications: A Review", International Journal of Precision Engineering and Manufacturing, vol. 17, No. 4, pp. 1-14, Apr. 2016.

* cited by examiner

SYSTEMS AND METHODS FOR THE FUNCTIONALIZATION OF POLYOLEFIN FIBERS

BACKGROUND

Field

The present disclosure relates to systems and methods for the functionalization of polyolefin fiber.

Technical Background

Polyolefins are the most widely used commercial polymers and account for more than 60% of the global plastic consumption. Polyolefins have a low production cost, good chemical stability, and desirable mechanical properties and processability. However, polyolefins may lack polar functionality. The functionalization of polyolefins may be desirable, as functionalization may result in generating new polyolefin-based materials with functional groups.

BRIEF SUMMARY

The functionalization of polyolefin fiber is well-known by those skilled in the art. However, conventional processes for functionalizing polyolefin fiber typically requires dip-coating the polyolefin fiber with a precursor solution. The precursor solution is held in a large vessel, such as a bath. For the functionalization, the precursor solution must be heated. Heating a bath of precursor solution requires a large amount of energy to keep the entire bath heated to the desired temperature.

Accordingly, there is an ongoing need for systems and methods for the functionalization of polyolefin fiber to increase the efficiency of the functionalization process. The present disclosure is directed to systems and methods for the functionalization of polyolefin fiber. In the present disclosure a reactor chamber and precursor sprinkler system may be used to increase the efficiency of the functionalization process. In the present disclosure, as further described herein, the need to constantly heat a large amount, such as a bath, of precursor solution is eliminated.

According to one or more aspects of the present disclosure, a system for the functionalization of polyolefin fiber may include a reactor chamber, a fiber pulley system, and a precursor sprinkler system. The reactor chamber may define an interior reactor space and a plurality of fiber inlet/outlet pairs positioned at opposite ends of respective fiber processing axes extending through the interior reactor space. The fiber pulley system may be positioned outside of the reactor chamber and may be arranged to direct polyolefin fiber from a fiber spool through the plurality of fiber inlet/outlet pairs, along a fiber processing path comprising the respective fiber processing axes. The precursor sprinkler system may be operable to aerosolize a precursor solution and contact the aerosolized precursor solution onto the polyolefin fiber passing through the interior reactor space of the reactor chamber along the respective fiber processing axes.

In one or more other aspects of the present disclosure, a method for functionalizing polyolefin fiber may include aerosolizing a precursor solution to form an aerosolized precursor solution, passing polyolefin fiber along a fiber pulley system into an interior reactor space of a reactor chamber along a fiber processing axis, contacting the polyolefin fiber with the aerosolized precursor solution as the polyolefin fiber passes through the interior reactor space of the reactor chamber along the respective fiber processing axis, and passing functionalized polyolefin fiber out of the interior reactor space of the reactor chamber. Contacting the polyolefin fiber with the aerosolized precursor solution may produce a functionalized polyolefin fiber.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

Figure 1:
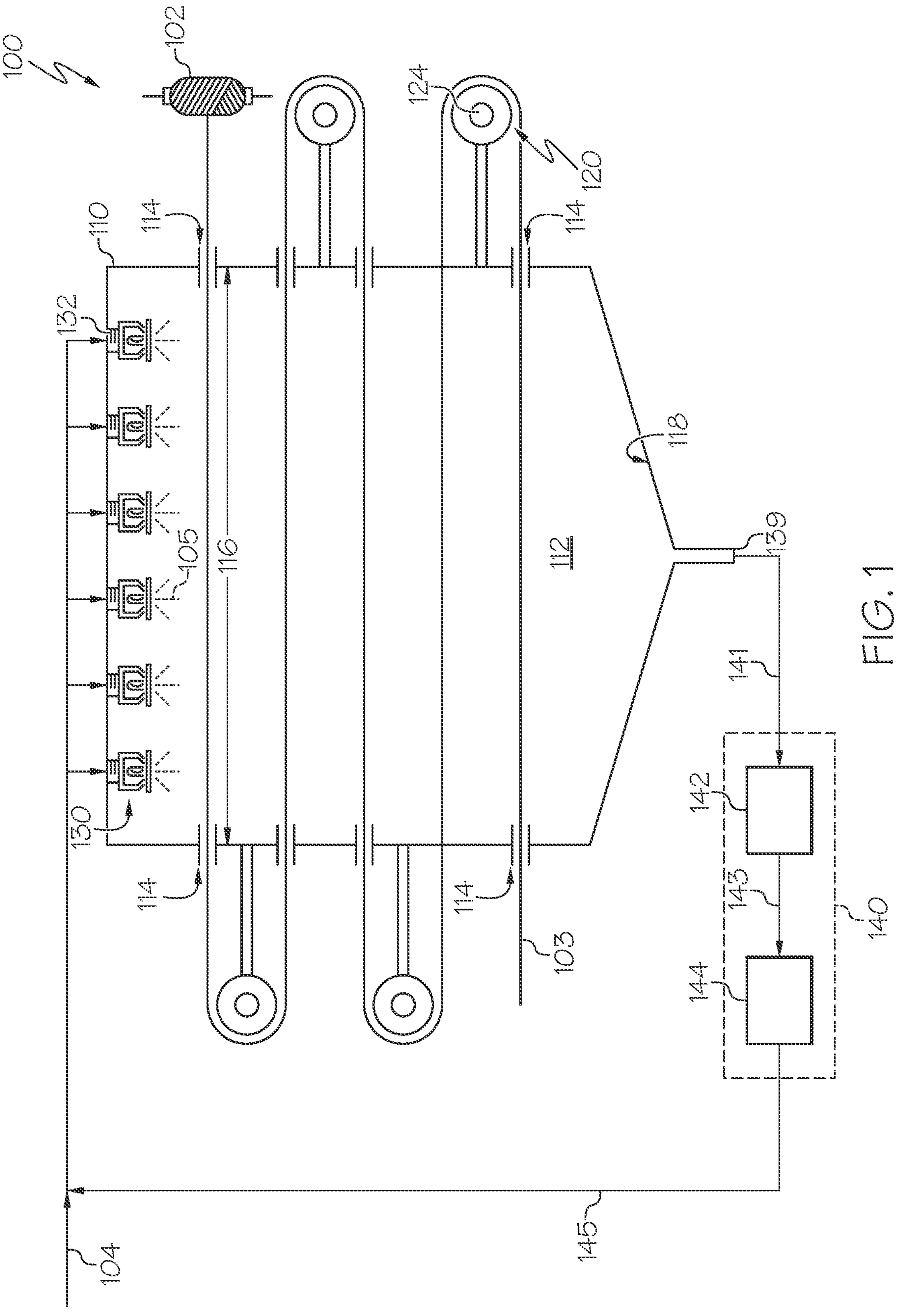
FIG. 1 schematically depicts a generalized flow diagram of a system for the functionalization of polyolefin fiber, according to one or more embodiments shown and described in this disclosure.
Figure 2A:
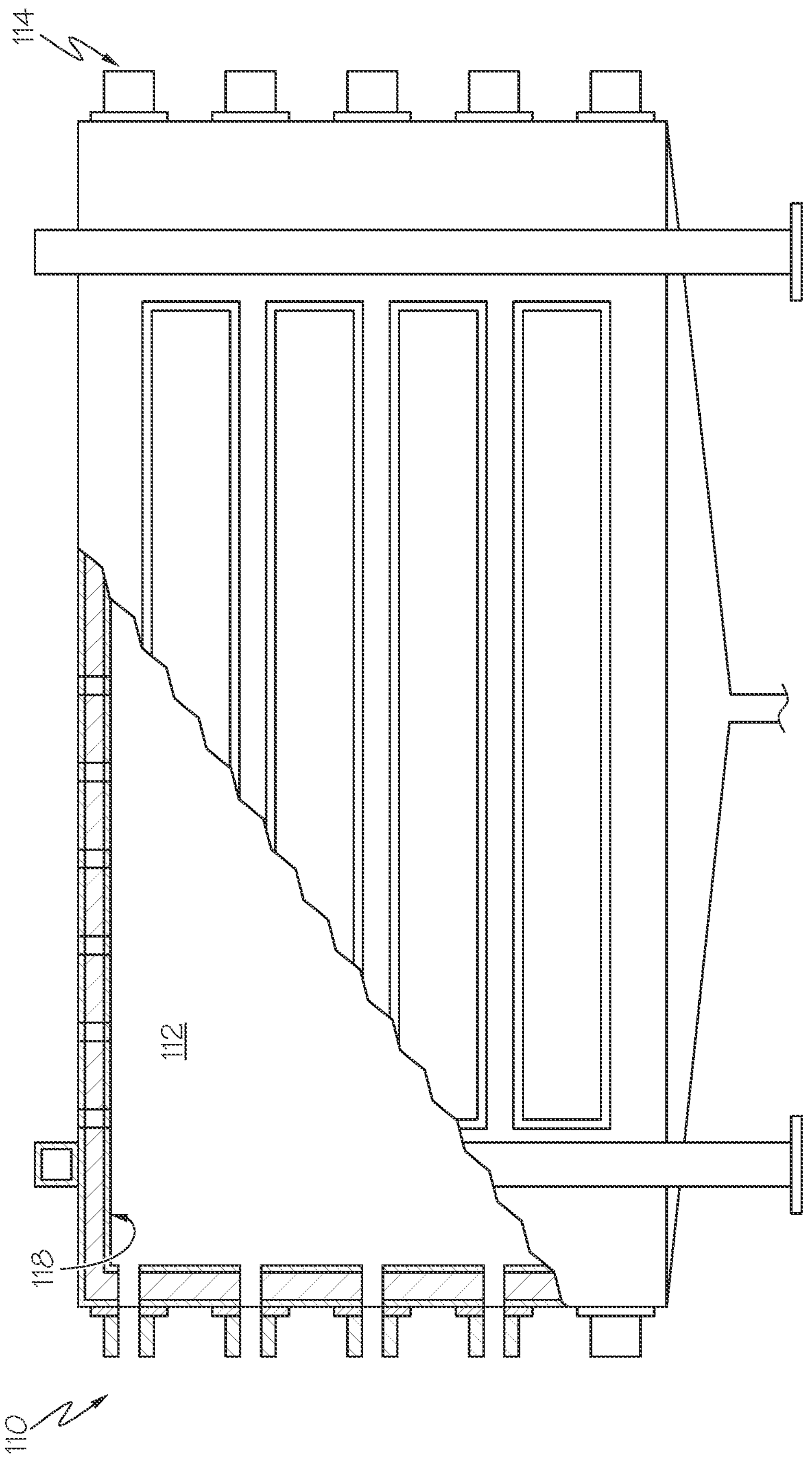
FIGS. 2A-2D schematically depict various views of reactor chambers, according to one or more embodiments shown and described in this disclosure.
Figure 2B:
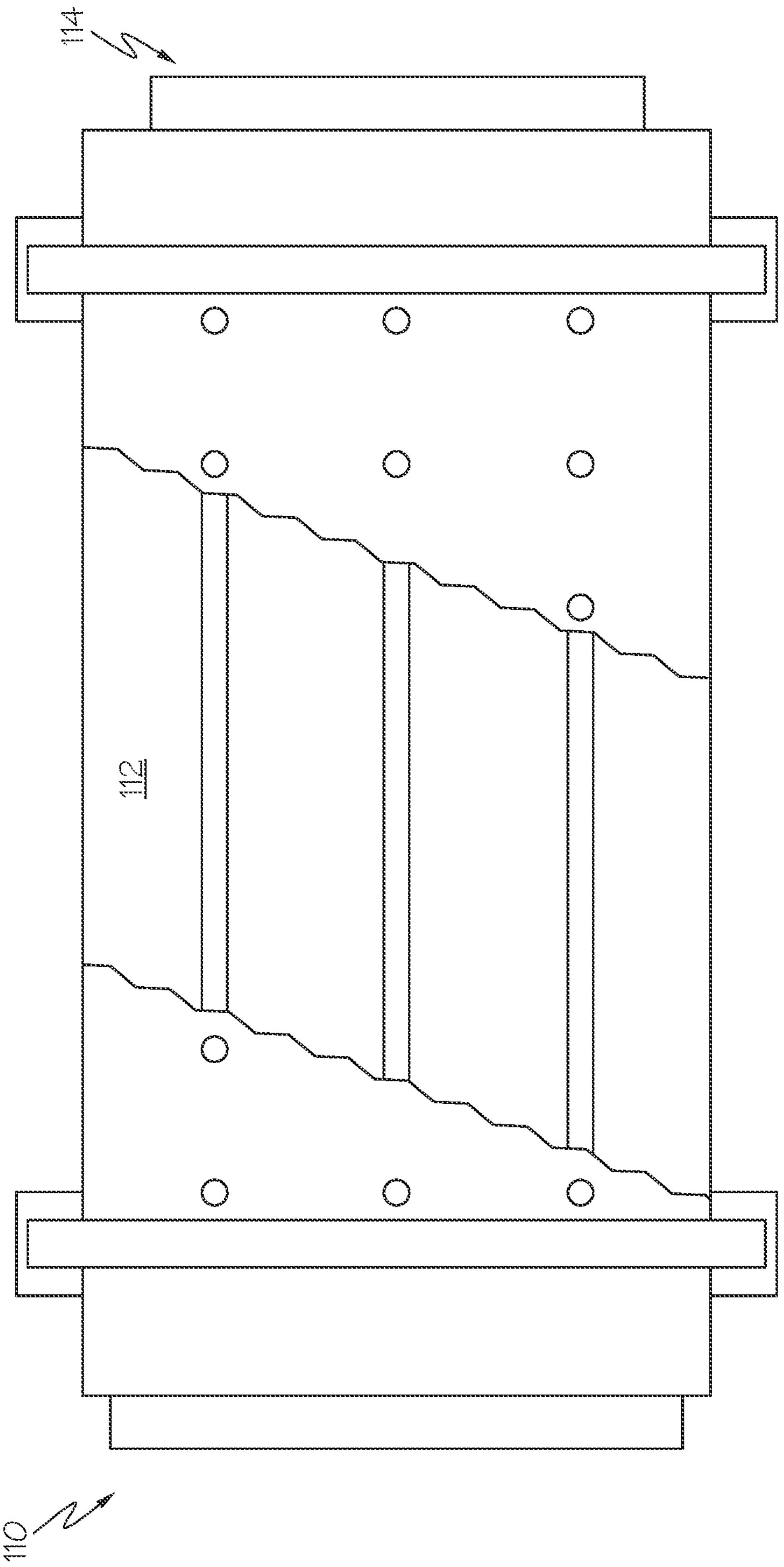
Figure 2C:
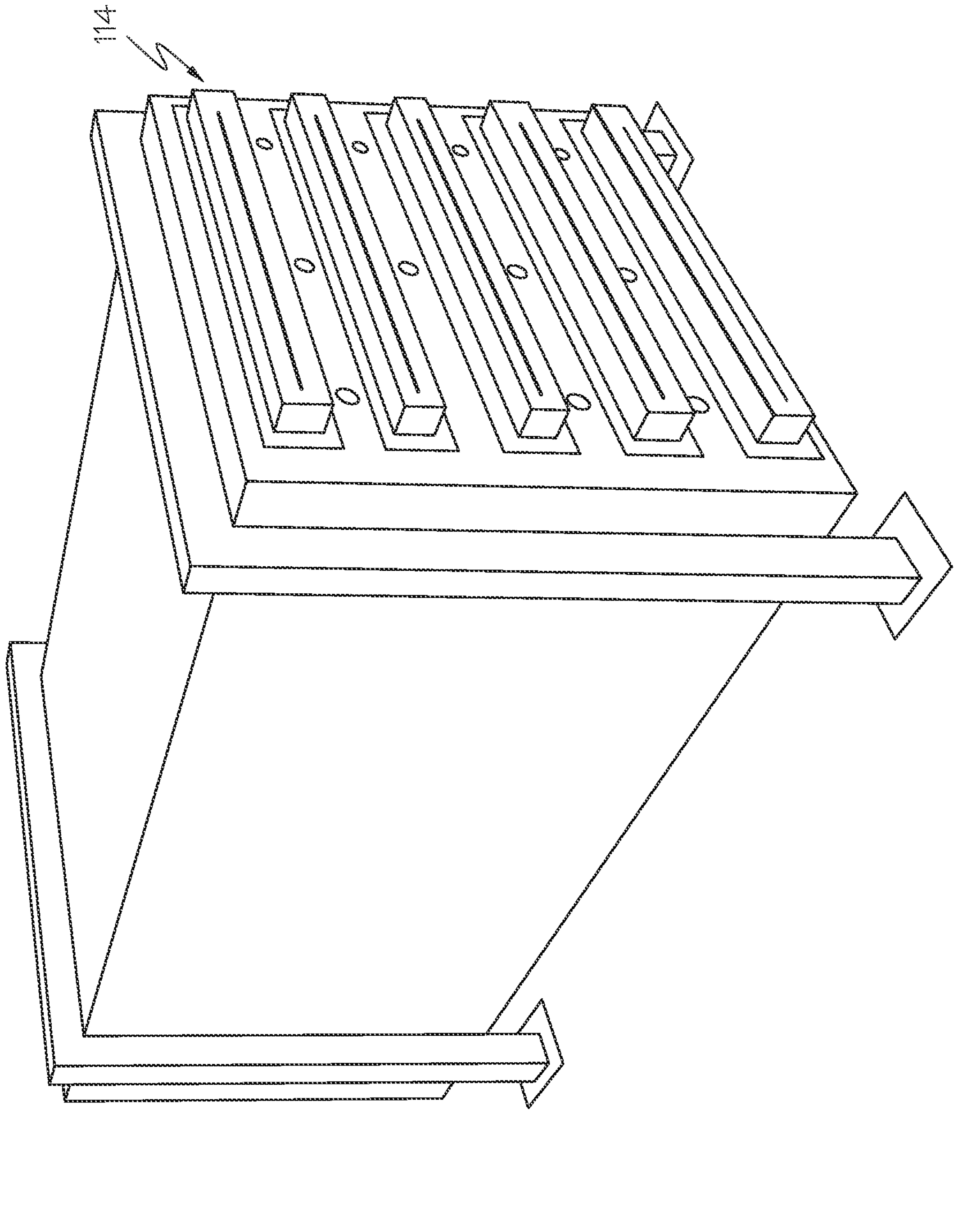
Figure 2D:
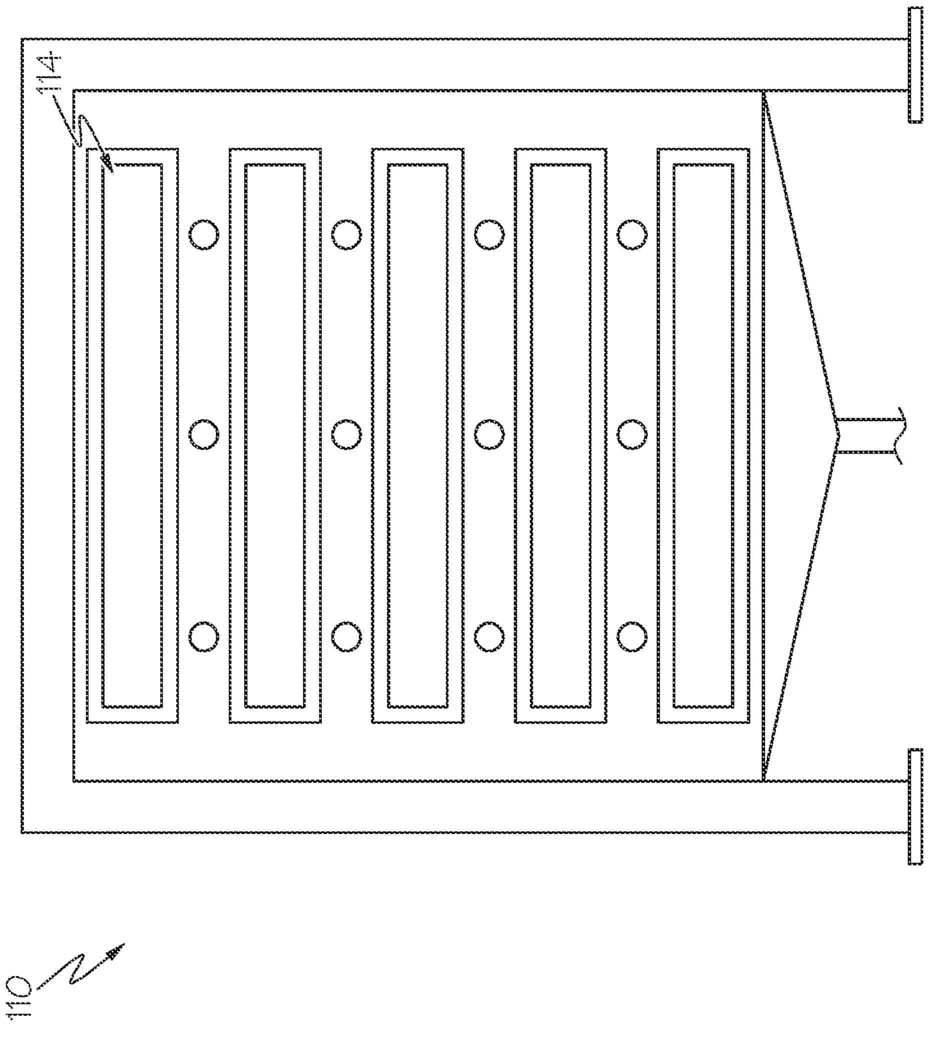
Figure 3:
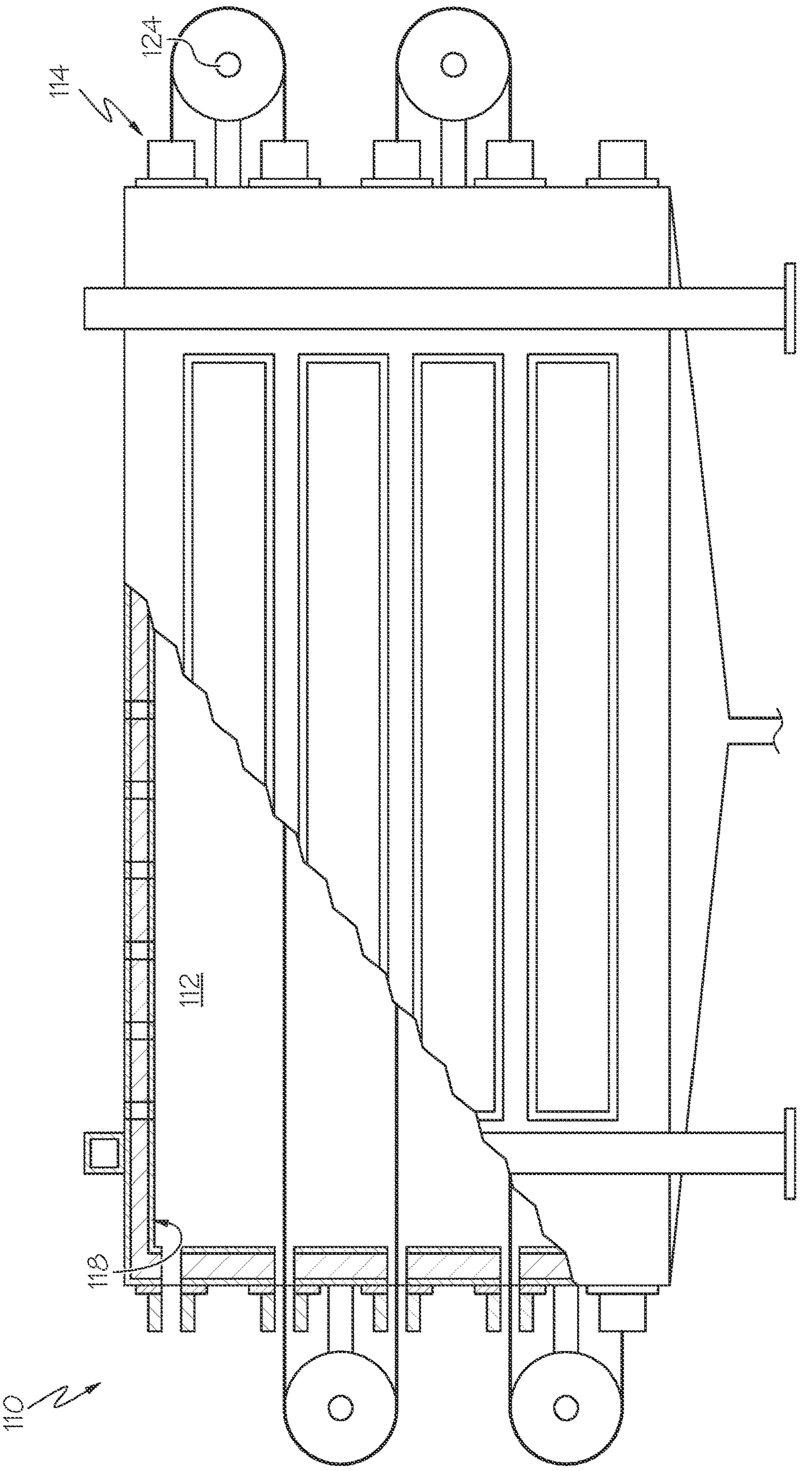
FIG. 3 schematically depicts a reactor chamber and pulley system, according to one or more embodiments shown and described in this disclosure.

For the purpose of describing the simplified schematic illustrations and descriptions of FIGS. 1-3 the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems may not be depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIG. 1. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

The present disclosure is directed to systems and methods for the functionalization of polyolefin fiber. In particular, the present disclosure is directed to systems comprising a reactor chamber, a fiber pulley system, and a precursor sprinkler system. The present disclosure is also directed to methods comprising aerosolizing a precursor solution to form an aerosolized precursor solution, passing polyolefin fiber along a fiber pulley system into an interior reactor space of a reactor chamber along a fiber processing axis, contacting the polyolefin fiber with the aerosolized precursor solution as the polyolefin fiber passes through the interior reactor space of the reactor chamber along the respective fiber processing axis, and passing functionalized polyolefin fiber out of the interior reactor space of the reactor chamber.

The various systems and methods for the functionalization of polyolefin fiber may provide increased efficiency for the functionalization of polyolefin fiber compared to conventional systems and processes for the functionalization of polyolefin fiber. That is, the various systems and methods for the functionalization of polyolefin fiber may reduce the amount of precursor solution that is needed during functionalization, as the precursor solution may be contacted with the polyolefin fiber as an aerosol instead of a liquid.

As used in this disclosure, "functionalization" may refer to any process resulting in the addition of functional groups to a compound through chemical synthesis.

As used in this disclosure, "aerosolizing" may refer to the conversion of a liquid into a fine spray or colloidal suspension of fine aerosol droplets in a carrier gas, such as air.

As used throughout the present disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined. Simply dividing a stream into two streams having the same composition is also not considered to comprise an intervening system that changes the composition of the stream.

As used in this disclosure, a "separation unit" refers to any separation device that at least partially separates one or more chemicals that are mixed in a process stream from one another. For example, a separation unit may selectively separate differing chemical species from one another, forming one or more chemical fractions. Examples of separation units include, without limitation, distillation columns, flash drums, knock-out drums, knock-out pots, centrifuges, filtration devices, traps, scrubbers, expansion devices, membranes, solvent extraction devices, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation.

As used in this disclosure, the term "effluent" may refer to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that system stream may be passed. For example, a slip stream (having the same composition) may carry some of the effluent away, meaning that only a portion of the effluent may enter the downstream system unit. The term "reaction effluent" may more particularly be used to refer to a stream that is passed out of a reactor or reaction zone.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream).

Referring now to FIG. 1, the systems 100 for the functionalization of polyolefin fiber 102 may include a reactor chamber 110, a fiber pulley system 120, and a precursor sprinkler system 130. The reactor chamber 110 may define an interior reactor space 112 and a plurality of fiber inlet/outlet pairs 114. The plurality of fiber inlet/outlet pairs 114 may be positioned at opposite ends of respective fiber processing axes 116 extending through the interior reactor space 112. The fiber pulley system 120 may be positioned outside of the reactor chamber 110 and may be arranged to direct polyolefin fiber 102 from a fiber spool 122 through the plurality of fiber inlet/outlet pairs 114, along a fiber processing path comprising the respective fiber processing axes 116. The precursor sprinkler system 130 may be operable to aerosolize a precursor solution 104 and contact aerosolized precursor solution 105 with the polyolefin fiber 102 passing through the interior reactor space 112 of the reactor chamber 110 along the respective fiber processing axes 116.

Referring now to FIGS. 1, 2A-D, and 3, the reactor chamber 110 may be any vessel or reactor operable to pass polyolefin fiber 102 through the interior reactor space 112 and to accommodate the fiber pulley system 120 and sprinklers 132 of the precursor sprinkler system 130. The plurality of fiber inlet/outlet pairs 114 may be positioned on a pair of opposite vertical walls of the reactor chamber 110. The first fiber inlet may be positioned near the fiber spool 122 where the polyolefin fiber 102 is stored prior to being passed into the reactor chamber 110. Pulleys of the fiber pulley system 120 may be positioned on the outside of the reactor chamber 110, with one pulley at each of the fiber inlet/outlets. The sprinklers 132 of the precursor sprinkler system 130 may be positioned in any arrangement on the top of the reactor chamber 110. As will be further described, the reactor chamber 110 may be in fluid communication with a precursor recycling system 140.

It should be noted that in FIGS. 2A-D, the fiber pulley system 120 and the precursor sprinkler system 130 have been removed to better show the reactor chamber 110. However, in FIGS. 2A-D, it is still visible where the fiber pulley system 120 and the precursor sprinkler system 130 may be fixed or attached to the reactor chamber 110. On the sides having the plurality of fiber inlet/outlet pairs 114, there are holes where the fiber pulley system 120 may be fixed to the reactor chamber 110. On the top of the reactor chamber 110, there are also holes where the precursor sprinkler system 130 may be fixed to the reactor chamber 110. It is contemplated that the fiber pulley system 120 and the precursor sprinkler system 130 may be attached to the reactor chamber 110 using any conventional or yet to be developed fastener. For example, the fiber pulley system 120 and the precursor sprinkler system 130 may be attached using hardware (nuts, bolts, washers, etc.), adhesive, welding, or any other suitable method to attach the components together.

The reactor chamber 110 may be operable to contact polyolefin fiber 102 with aerosolized precursor solution 105 at conditions sufficient to functionalize the polyolefin fiber 102. The reactor chamber 110 may operate at a temperature ranging from 10 degrees Celsius (° C.) to 200° C., such as from 20° C. to 180° C., or from 30° C. to 150° C. The reactor chamber 110 may operate at a pressure ranging from 0.1 bar to 3.0 bar, such as from 0.5 bar to 2.5 bar, or from 0.5 bar to 2.0 bar. The reactor chamber 110 may operate for a total residence time of 0 seconds to 20 hours, such as from 0 seconds to 10 hours, or from 0 seconds to 60 minutes. The residence time per pass (i.e., per individual ones of the multiple fiber processing axes 116) may range from 0 seconds to 4 hours, such as from 0 seconds to 2 hours, or from 0 seconds to 12 minute. The residence time for the sum of the individual ones of the multiple fiber processing axes 116 will be equivalent to the total residence time.

The reactor chamber 110 may define a plurality of fiber inlet/outlet pairs 114. Respective ones of the plurality fiber inlet/outlet pairs 114 may be defined as a fiber processing axes 116. That is, the fiber processing axes 116 may extend from the fiber inlet to the fiber outlet. The fiber processing axes 116 may be horizontal. It is contemplated that the fiber processing axes 116 need not be perfectly horizontal (i.e., level). For instance, a sloped fiber processing axes 116 is contemplated. The fiber processing axes 116 may be sloped upward from the fiber inlet to the fiber outlet. Alternatively, the fiber processing axes 116 may be sloped downward from the fiber inlet to the fiber outlet. The respective fiber processing axes 116 of the plurality of fiber inlet/outlet pairs 114 may be arranged vertically.

Referring again to FIG. 1, together, the fiber processing axes 116 of the plurality of fiber inlet/outlet pairs 114 may define the fiber processing path. The fiber processing path may also include portions outside of the reactor chamber 110, where the polyolefin fiber 102 is routed through the fiber pulley system 120. As the respective fiber processing axes 116 of the plurality of fiber inlet/outlet pairs 114 may be arranged vertically, the residence time of the polyolefin fiber 102 in the reactor chamber 110 may be maximized. By maximizing the residence time, the desired grafting rate may be achieved.

Referring again to FIGS. 1 and 2A-D, as previously discussed, the reactor chamber 110 may define an interior reactor space 112. The interior reactor space 112 may comprise an interior reactor space liner 118 operable to protect the reactor chamber 110 from the precursor solution 104. Since the precursor solution 104 may be corrosive or caustic, it may be necessary to provide an interior reactor space liner 118 such that the reactor chamber 110 realizes reduced corrosion or degradation during operation. The interior reactor space liner 118 may be formed from a single fluoropolymer or a blend of a plurality of fluoropolymers. In embodiments, the fluoropolymer may comprise polytetrafluoroethylene, perfluoroalkoxy, ethylene chlorotrifluoroethylene, polyvinylidene fluoride, or combinations of these. It is contemplated that any other conventional or yet to be developed fluoropolymer may be used to form the interior reactor space liner 118.

The reactor chamber 110 may further comprise nitrogen curtains (not shown) at respective ones of the plurality of fiber inlet/outlet pairs 114. The nitrogen curtains may be formed by directing nitrogen at the openings of the plurality fiber inlet/outlet pairs 114. The nitrogen curtains may be operable to reduce the passage of air and moisture into and out of the reactor chamber 110. The nitrogen curtains may prevent ambient air (such as oxygen) from being drawn into the reactor chamber 110 through the plurality fiber inlet/outlet pairs 114.

The fiber pulley system 120 may comprise a fiber pulley 124 positioned at each of individual ones of the fiber inlet/outlet pairs 114. The fiber pulleys 124 may be pulley wheels that are operable to route the polyolefin fiber 102 along the fiber processing path. The pulley wheels may be any conventional or yet to be designed pulley wheels or pulley system. While the fiber pulley system 120 is depicted as being outside the reactor chamber 110, it is contemplated that the fiber pulley system 120 may be arranged inside the reactor chamber 110.

Referring again to FIG. 1, the precursor sprinkler system 130 may be operable to aerosolize the precursor solution 104 to form the aerosolized precursor solution 105. The system and precursor sprinkler system 130, as further described in the present disclosure, may include a precursor recycling system 140 (FIG. 1). The precursor sprinkler system 130 may comprise a plurality of sprinklers 132 operable to aerosolize the precursor solution 104. The plurality of sprinklers 132 may be positioned at the top of the reactor chamber 110 such that the aerosolized precursor solution 105 is evenly distributed throughout the entire reactor chamber 110. In embodiments, the plurality of sprinklers 132 may be oscillating sprinkles.

The aerosolized precursor solution 105 may comprise fine aerosol droplets. As used in the present disclosure, "fine aerosol droplets" may refer to a plurality of aerosol droplets having a droplet size ranging from 0.1 micrometer (μm) to 150 μm, such as from 0.5 μm to 100 μm, or from 1 μm to 75 μm.

Referring again to FIG. 1, as previously discussed, systems 100 for the functionalization of polyolefin fiber 102 may further include the precursor recycling system 140. The precursor recycling system 140 may be in fluid communication with the reactor chamber 110 and the precursor sprinkler system 130. The precursor recycling system 140 may comprise a precursor filtration unit 142 and a precursor regeneration unit 144. The precursor filtration unit 142 may be disposed downstream of the reactor chamber 110. The precursor filtration unit 142 may be upstream of the precursor regeneration unit 144. After aerosolized precursor solution 105 is contacted with the polyolefin fiber 102, any excess aerosolized precursor solution 105 may coalesce at the bottom of the reactor chamber 110 and form excess precursor solution 141. The reactor chamber 110 may be sloped at the bottom such that excess precursor solution 141 may pass out of a reactor chamber outlet 139. The excess precursor solution 141 may contain, in addition to precursor solution 104, trace amounts of polyolefin fiber 102. The precursor filtration unit 142 may separate excess precursor solution 141 from polyolefin fiber 102 to produce a filtered excess precursor solution 143.

The precursor regeneration unit 144 may be disposed downstream of the precursor filtration unit 142. The precursor regeneration unit 144 may similarly be disposed upstream of the reactor chamber 110. The precursor regeneration unit 144 may preheat the filtered excess precursor solution 143 to produce a filtered and preheated excess precursor solution 145. The precursor regeneration unit 144 operates at a temperature ranging from 10° C. to 200° C., such as from 20° C. to 180° C. After the excess precursor solution 141 is filtered and preheated, it may be passed to the precursor sprinkler system 130 to be recycled to the reactor chamber 110. The filtered and preheated excess precursor solution 145 may be combined with fresh precursor solution 104 upstream of the precursor sprinkler system 130. The excess precursor solution 141, once filtered and preheated, may be combined with fresh precursor solution 104 to account for a portion of the precursor solution 104 that may have reacted with the polyolefin fiber 102, in the form of aerosolized precursor solution 105.

Referring again to FIG. 1, methods for functionalizing polyolefin fiber 102 may include aerosolizing the precursor solution 104 to form the aerosolized precursor solution 105, passing polyolefin fiber 102 along the fiber pulley system 120 into the interior reactor space 112 of the reactor chamber 110 along the fiber processing axis, contacting the polyolefin fiber 102 with the aerosolized precursor solution 105 as the polyolefin fiber 102 passes through the interior reactor space 112 of the reactor chamber 110 along the respective fiber processing axis, and passing functionalized polyolefin fiber 103 out of the interior reactor space 112 of the reactor chamber 110. As previously described, contacting the polyolefin fiber 102 with the aerosolized precursor solution 105 produces functionalized polyolefin fiber 103.

The fiber pulley system 120 may have any of the features previously discussed in this disclosure for the fiber pulley system 120. The reactor chamber 110 may have any of the features previously discussed in this disclosure for the reactor chamber 110. The precursor sprinkler system 130 may be operable to aerosolize the precursor solution 104 to form the aerosolized precursor solution 105 and, similarly, may have any of the features previously discussed in this disclosure for the precursor sprinkler system 130.

In embodiments, methods for functionalizing polyolefin fiber 102 may further include passing the polyolefin fiber 102 through the interior reactor space 112 of the reactor chamber 110 a plurality of times. As previously described the fiber processing path may extend along multiple fiber processing axes 116 extending through the interior reactor space 112 and the fiber pulley system 120 positioned outside the reactor chamber 110. It follows that the polyolefin fiber 102 may be passed through a plurality of fiber inlet/outlet pairs 114 and, therefore, through the interior reactor space 112 of the reactor chamber 110 a plurality of times.

Further, methods for functionalizing polyolefin fiber 102 may further include collecting excess precursor solution 141 in the reactor chamber 110 and recycling the excess precursor solution 141. Recycling the excess precursor solution 141 may comprise passing the excess precursor solution 141 through a precursor filtration unit 142 to remove polyolefin fiber 102 and preheating the filtered excess precursor solution 143 in a precursor regeneration unit 144. Recycling the excess precursor solution 141 may be performed in the precursor filtration unit 142 and the precursor regeneration unit 144 and may incorporate any of the features previously discussed in this disclosure for the precursor recycling system 140.

It is contemplated that various types of polyolefin fiber 102 may be used in the systems 100 and methods of the present disclosure. The polyolefin fiber 102 may comprise a single component or may comprise two or more components. The polyolefin fiber 102 may be an individual yarn or may comprise two or more yarns. When the polyolefin fiber 102 comprises two or more yarns, the two or more yarns may be woven, knitted, or braided together. In embodiments, the polyolefin fiber 102 may be polyethylene fiber.

Similarly, it is contemplated that various types of polyolefin fiber 102 may be used in the systems 100 and methods of the present disclosure. The precursor solution 104 may be selected depending on the polyolefin fiber 102 being used and the type of functionalization desired. The precursor solution 104 may comprise an organic solvent or an inorganic solvent. For example, the precursor solution 104 may comprise sulfuric acid.

For example, it may be desirable to use the systems 100 and methods of the present disclosure for carbon fiber manufacturing (i.e., the sulfonation of polyethylene). In such applications, of polyethylene fiber may undergo continuous thermo-chemical functionalization with sulfuric acid. Conventional methods of producing carbon fiber may require using a dip-coating process where polyethylene fiber is sulfonated to reach an infusible state by directing the polyethylene fiber into a sulfuric acid bath. This conventional method requires considerable amounts of sulfuric acid as well as energy used to heat the sulfuric acid bath to a temperature ranging from 120° C. to 180° C. Conversely, the systems 100 and methods of the present disclosure do not require a sulfuric acid bath nor for the sulfuric acid bath to be heated to a temperature ranging from 120° C. to 180° C. This may result in a lower energy cost, as the amount of sulfuric acid heated is not as high. It may also be safer as less sulfuric acid is needed at any given time.

One or more aspects of the present disclosure are described herein. A first aspect of the present disclosure may include a system for the functionalization of polyolefin fiber. The system may include a reactor chamber, a fiber pulley system, and a precursor sprinkler system. The reactor chamber may define an interior reactor space and a plurality of fiber inlet/outlet pairs positioned at opposite ends of respective fiber processing axes extending through the interior reactor space. The fiber pulley system may be positioned outside of the reactor chamber and may be arranged to direct polyolefin fiber from a fiber spool through the plurality of fiber inlet/outlet pairs, along a fiber processing path comprising the respective fiber processing axes. The precursor sprinkler system may be operable to aerosolize a precursor solution and contact the aerosolized precursor solution with the polyolefin fiber passing through the interior reactor space of the reactor chamber along the respective fiber processing axes.

A second aspect of the present disclosure may include the first aspect, wherein the interior reactor space comprises an interior reactor space liner operable to protect the reactor chamber from the precursor solution.

A third aspect of the present disclosure may include the second aspect, wherein the interior reactor space liner is a fluoropolymer or a blend of a plurality of fluoropolymers.

A fourth aspect of the present disclosure may include the third aspect, wherein the fluoropolymer comprises polytetrafluoroethylene, perfluoroalkoxy, ethylene chlorotrifluoroethylene, polyvinylidene fluoride.

A fifth aspect of the present disclosure may include any one of the first through fourth aspects, wherein the respective fiber processing axes of the plurality of fiber inlet/outlet pairs are arranged vertically.

A sixth aspect of the present disclosure may include any one of the first through fifth aspects, wherein the reactor chamber operates at a temperature ranging from 10 degrees Celsius to 200 degrees Celsius.

A seventh aspect of the present disclosure may include any one of the first through sixth aspects, wherein the reactor chamber operates at a pressure ranging from 0.1 bar to 30 bar.

An eighth aspect of the present disclosure may include any one of the first through seventh aspects, wherein the polyolefin fibers are contacted with the aerosolized precursor solution in the reactor chamber for a total residence time of 0 seconds to 20 hours.

A ninth aspect of the present disclosure may include any one of the first through eighth aspects, further comprising nitrogen curtains positioned at each of the plurality of fiber inlet/outlet pairs to reduce the passage of air and moisture into and out of the reactor chamber.

A tenth aspect of the present disclosure may include any one of the first through ninth aspects, wherein the fiber pulley system comprises a fiber pulley positioned at each of individual ones of the fiber inlet/outlet pairs.

An eleventh aspect of the present disclosure may include any one of the first through tenth aspects, wherein the precursor sprinkler system comprises a plurality of sprinklers operable to aerosolize the precursor solution.

A twelfth aspect of the present disclosure may include the eleventh aspect, wherein the plurality of sprinklers are oscillating sprinklers.

A thirteenth aspect of the present disclosure may include any one of the first through twelfth aspects, further comprising a precursor recycling system comprising a precursor filtration unit and a precursor regeneration unit, wherein the precursor filtration unit separates excess precursor solution from polyolefin fiber and the precursor regeneration unit preheats the excess precursor solution.

A fourteenth aspect of the present disclosure may include the thirteenth aspect, wherein the precursor recycling system is in fluid communication with the reactor chamber and the precursor sprinkler system.

A fifteenth aspect of the present disclosure may include either the thirteenth or fourteenth aspect, wherein the precursor regeneration unit is downstream of the precursor filtration unit.

A sixteenth aspect of the present disclosure may include any one of the thirteenth through fifteenth aspects, wherein the precursor regeneration unit operates at a temperature ranging from 10 degrees Celsius to 200 degrees Celsius.

A seventeenth aspect of the present disclosure may include a method for functionalizing polyolefin fiber. The method may include aerosolizing a precursor solution to form an aerosolized precursor solution, passing polyolefin fiber along a fiber pulley system into an interior reactor space of a reactor chamber along a fiber processing axis, contacting the polyolefin fiber with the aerosolized precursor solution as the polyolefin fiber passes through the interior reactor space of the reactor chamber along the respective fiber processing axis, wherein contacting the polyolefin fiber with the aerosolized precursor solution produces a functionalized polyolefin fiber, and passing functionalized polyolefin fiber out of the interior reactor space of the reactor chamber.

An eighteenth aspect of the present disclosure may include the seventeenth aspect, wherein the polyolefin fiber comprises a single component.

A nineteenth aspect of the present disclosure may include either the seventeenth or eighteenth aspect, wherein the polyolefin fiber comprises two or more components.

A twentieth aspect of the present disclosure may include any one of the seventeenth through nineteenth aspects, wherein the polyolefin fiber comprises an individual yarn.

A twenty-first aspect of the present disclosure may include any one of the seventeenth through twentieth aspects, wherein the polyolefin fiber comprises two or more yarns.

A twenty-second aspect of the present disclosure may include any one of the seventeenth through twenty-first aspects, wherein the two or more yarns are woven, knitted, or braided together.

A twenty-third aspect of the present disclosure may include any one of the seventeenth through twenty-second aspects, further comprising passing the polyolefin fiber through the interior reactor space of the reactor chamber a plurality of times.

A twenty-fourth aspect of the present disclosure may include any one of the seventeenth through twenty-third aspects, wherein the polyolefin fiber is polyethylene fiber.

A twenty-fifth aspect of the present disclosure may include any one of the seventeenth through twenty-fourth aspects, wherein aerosolizing the precursor solution comprises passing the precursor solution through a sprinkler.

A twenty-sixth aspect of the present disclosure may include the twenty-fifth aspect, wherein the sprinkler is an oscillating sprinkler.

A twenty-seventh aspect of the present disclosure may include any one of the seventeenth through twenty-sixth aspects, wherein the precursor solution comprises an inorganic solvent.

A twenty-eighth aspect of the present disclosure may include the twenty-seventh aspect, wherein the precursor solution comprises sulfuric acid.

A twenty-ninth aspect of the present disclosure may include any one of the seventeenth through twenty-eighth aspects, further comprising collecting excess precursor solution in the reactor chamber and recycling the excess precursor solution.

A thirtieth aspect of the present disclosure may include the twenty-ninth aspect, wherein recycling the excess precursor solution comprises passing the excess precursor solution through a filtration unit to remove polyolefin fiber and preheating the excess precursor solution.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A system for the functionalization of polyolefin fiber, the system comprising a reactor chamber, a fiber pulley system, and a precursor sprinkler system, wherein:

the reactor chamber defines an interior reactor space and a plurality of fiber inlet/outlet pairs positioned at opposite ends of respective fiber processing axes extending through the interior reactor space;

the fiber pulley system is positioned outside of the reactor chamber and is arranged to direct polyolefin fiber from a fiber spool through the plurality of fiber inlet/outlet pairs, along a fiber processing path comprising the respective fiber processing axes;

the precursor sprinkler system is operable to aerosolize a precursor solution and contact the aerosolized precursor solution with the polyolefin fiber passing through the interior reactor space of the reactor chamber along the respective fiber processing axes; and a precursor recycling system comprising a precursor filtration unit and a precursor regeneration unit, wherein the precursor filtration unit separates excess precursor solution from polyolefin fiber and the precursor regeneration unit preheats the excess precursor solution.

2. The system of claim 1, wherein the interior reactor space comprises an interior reactor space liner operable to protect the reactor chamber from the precursor solution.

3. The system of claim 2, wherein the interior reactor space liner is a fluoropolymer or a blend of a plurality of fluoropolymers.

4. The system of claim 1, wherein the reactor chamber operates at a temperature ranging from 10 degrees Celsius to 200 degrees Celsius, a pressure ranging from 0.1 bar to 30 bar, and for a total residence time of 0 seconds to 20 hours.

5. The system of claim 1, further comprising nitrogen curtains positioned at each of the plurality of fiber inlet/outlet pairs to reduce the passage of air and moisture into and out of the reactor chamber.

6. The system of claim 1, wherein the fiber pulley system comprises a fiber pulley positioned at each of individual ones of the fiber inlet/outlet pairs.

7. The system of claim 1, wherein the precursor sprinkler system comprises a plurality of sprinklers operable to aerosolize the precursor solution.

8. The system of claim 7, wherein the plurality of sprinklers are oscillating sprinklers.

9. The system of claim 1, wherein the precursor recycling system is in fluid communication with the reactor chamber and the precursor sprinkler system.

10. The system of claim 1, wherein the precursor regeneration unit is downstream of the precursor filtration unit.

11. The system of claim 1, wherein the precursor regeneration unit operates at a temperature ranging from 10 degrees Celsius to 200 degrees Celsius.

12. The system of claim 1, wherein the respective fiber processing axes of the plurality of fiber inlet/outlet pairs are arranged vertically.

13. A method for functionalizing polyolefin fiber using the system of claim 1, the method comprising:

aerosolizing the precursor solution to form the aerosolized precursor solution;

passing polyolefin fiber along the fiber pulley system through the interior reactor space of the reactor chamber along the fiber processing path;

contacting the polyolefin fiber with the aerosolized precursor solution as the polyolefin fiber passes through the interior reactor space of the reactor chamber, wherein contacting the polyolefin fiber with the aerosolized precursor solution produces a functionalized polyolefin fiber;

passing functionalized polyolefin fiber out of the interior reactor space of the reactor chamber; and collecting excess precursor solution in the reactor chamber and recycling the excess precursor solution, wherein recycling the excess precursor solution comprises:

passing the excess precursor solution through the precursor filtration unit to remove polyolefin fiber; and preheating the filtered excess precursor solution in the precursor regeneration unit.

14. The method of claim 13, wherein the polyolefin fiber comprises a single component.

15. The method of claim 13, wherein the polyolefin fiber comprises an individual yarn.

16. The method of claim 13, further comprising passing the polyolefin fiber through the interior reactor space of the reactor chamber a plurality of times.

17. The method of claim 13, wherein the polyolefin fiber is polyethylene fiber.

18. The method of claim 13, wherein the precursor solution comprises an inorganic solvent.

19. The method of claim 13, wherein the precursor solution comprises sulfuric acid.

* * * * *